Nov. 19, 1929. T. L. FAWICK 1,736,151
TRANSMISSION
Filed July 6, 1926 3 Sheets-Sheet 1
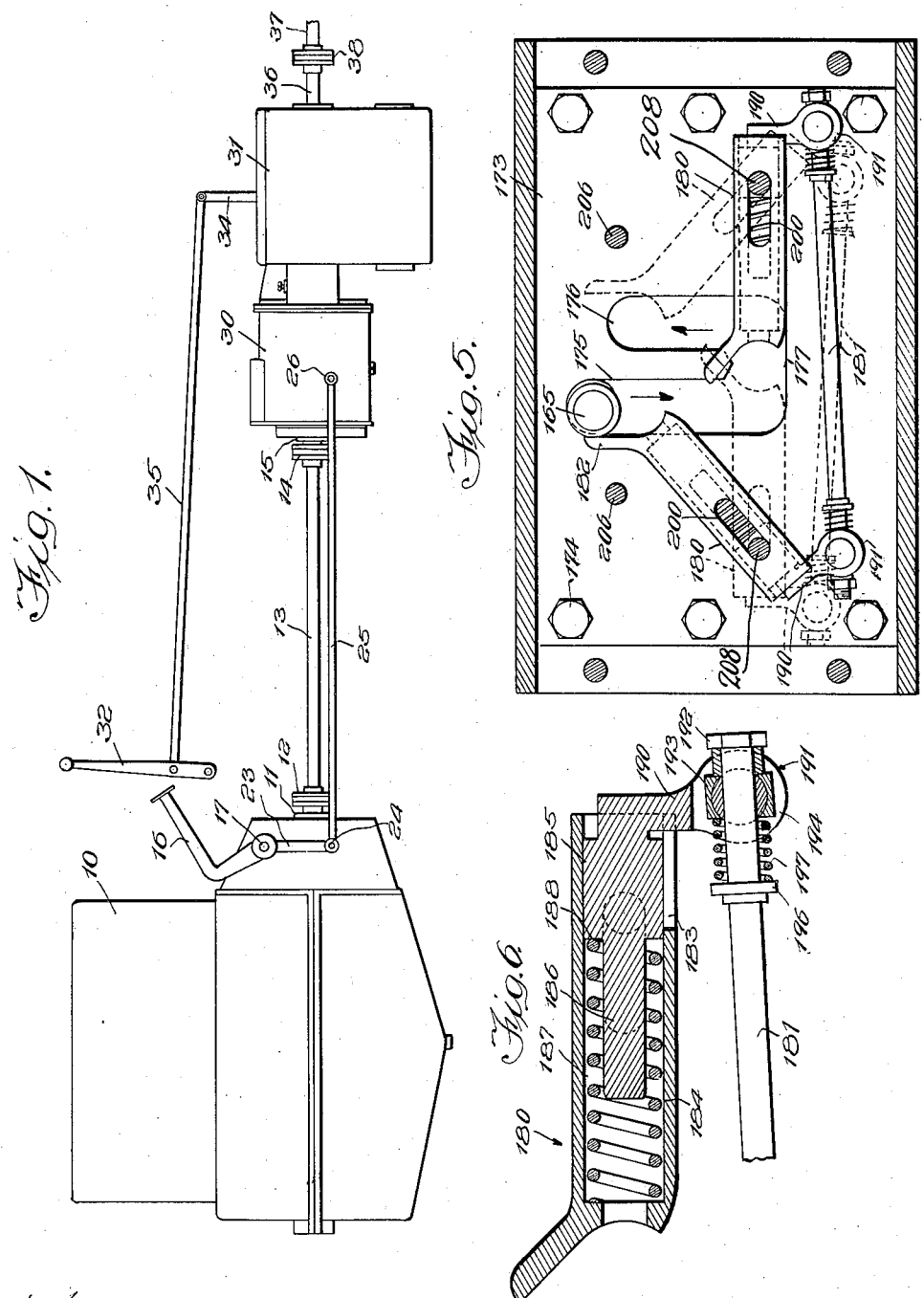

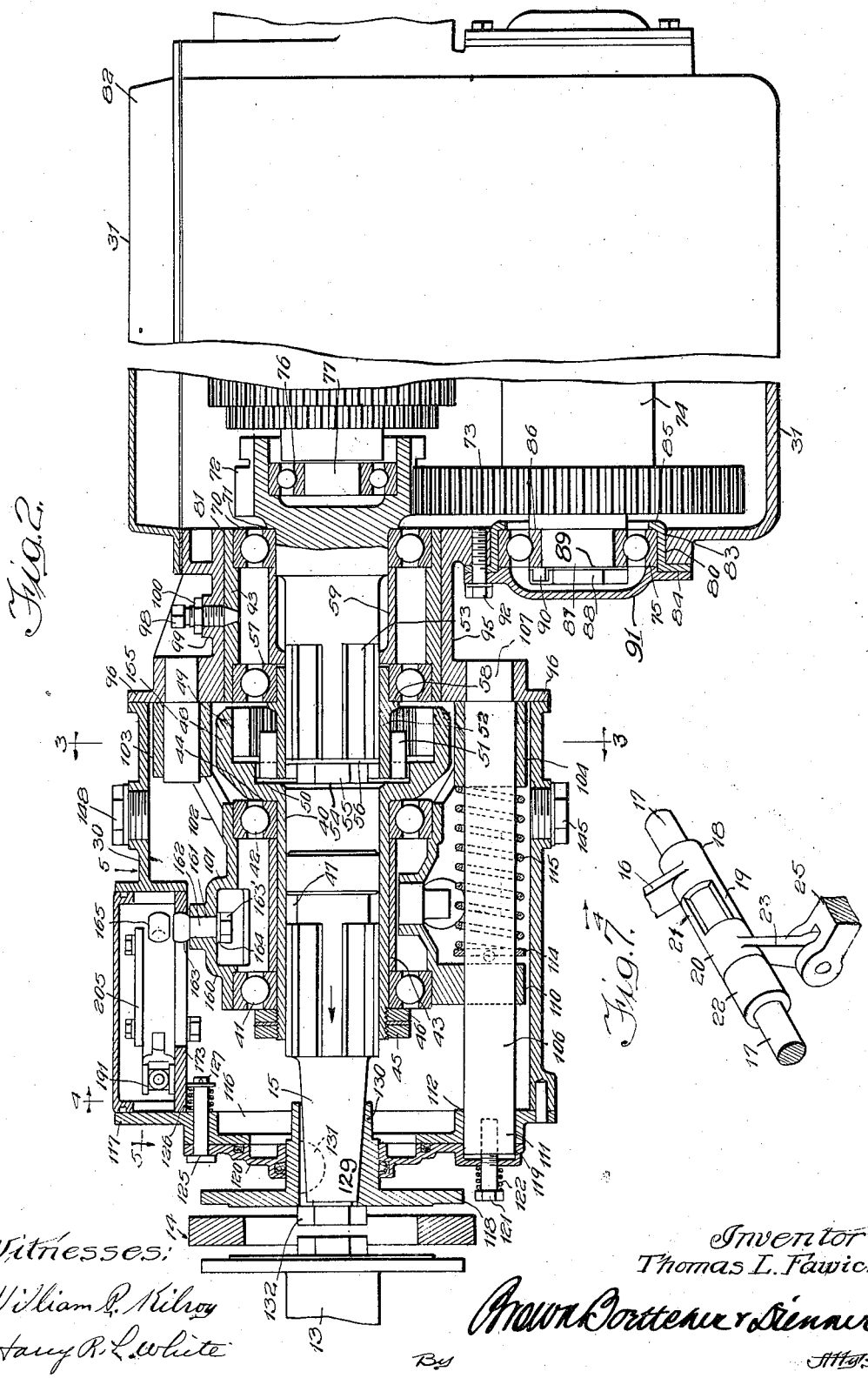

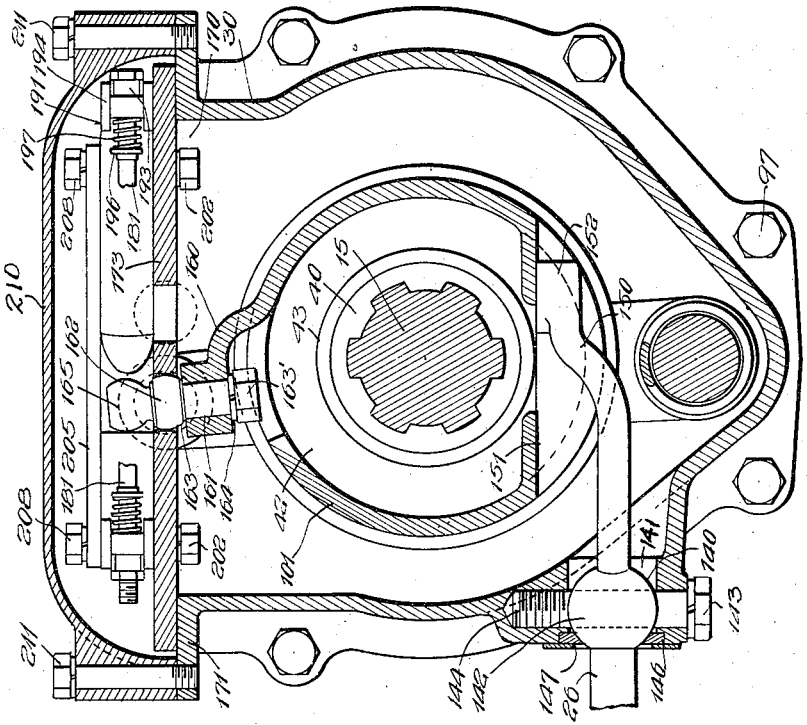

Patented Nov. 19, 1929

1,736,151

UNITED STATES PATENT OFFICE

THOMAS L. FAWICK, OF RACINE, WISCONSIN, ASSIGNOR TO BROWN-LIPE GEAR COMPANY, OF SYRACUSE, NEW YORK, A CORPORATION OF NEW YORK

TRANSMISSION

Application filed July 6, 1926. Serial No. 120,572.

The present invention relates generally to change speed mechanism, and more particularly to an improved transmission. My invention may be employed with considerable advantage when applied to motor driven vehicles. such as a bus or truck, but it, of course, is to be understood that it has many other applications, as will become more apparent with the progress of the accompanying description.

I propose to provide in accordance with the general features of my invention what I shall hereinafter refer to as an amidship transmission which is particularly adapted for use in conjunction with trucks and motor busses wherein a relatively long propeller shaft is necessitated due to the length of the vehicle and the comparatively great distance separating the engine from the rear axle. My transmission, however, is of the same general character as that disclosed in my three Patents #1,495,782, #1,515,850 and #1,524,476.

The present transmission, like that of each of my aforesaid patents, is associated with and carried by the usual standard accelerating and reverse transmission housing of a motor vehicle where, as is obvious, the weight is a sprung weight.

My amidship transmission is also similar to the transmission mechanism disclosed in each of the first two of the aforesaid patents, in that it utilizes a speed range mechanism including a spur pinion and an internal gear with a clutch socket. The advantages of this construction are numerous, as was fully set forth in my previous patents. The principal advantages have to do with the minimizing of chattering, bearing wear and gear wear.

In practice I have found that in trucks, motor busses and the like there is considerable play in the propeller shaft due to its relatively great length. To remedy this, in some cases the length of the propeller shaft has been decreased by positioning the usual accelerating and reverse transmission further from the engine and nearer to the rear axle. That is to say, the transmission is disposed at approximately the center of the vehicle.

Now in my prior patent I have disclosed an auxiliary transmission associated with the propeller side of the standard transmission. Such an arrangement is ideal for the ordinary type of motor vehicle. I find, however, in the case of trucks, that by positioning the auxiliary change speed mechanism amidship so to speak, or, in other words, intermediate the standard transmission and the engine, it affords better transmission of power and results in several advantages.

First, with such an arrangement the length of the propeller shaft may be decreased. This, as is evident, tends to obviate the relatively great amount of play formerly associated with such a shaft.

Secondly, it subjects my auxiliary transmission to less torque and hence, less wear. That is to say, since the auxiliary transmission is positioned before the main transmission, it operates at relatively high speeds and is not subject to the same torque as the main transmission which operates at lower speeds and which is connected directly to the rear axle of the vehicle through the propeller shaft. Now, obviously, this feature is ideal since it does not necessitate any changes in the size and the weight of the standard accelerating and reverse transmission which is already built to operate under considerable torque. Then, too, the auxiliary transmission when it is disposed before the main transmission can be made of lighter and smaller parts than when it is located in the rear of the main gearing.

Thirdly, it facilitates the manual control of my novel transmission, as will become apparent in the description to hereinafter follow.

Lastly, it permits of a better support for the intermediate shaft positioned between the engine and the transmission mechanism.

Also it should be noted that by positioning the transmission amidship the intermediate shaft located between them and the engine can be possessed of considerable play. This arrangement facilitates the operation of the auxiliary transmission especially where it is necessary to shift one of the shafts laterally in order to obtain a reduction in speed. Moreover, heretofore when the auxiliary transmission was associated with the propeller shaft of the vehicle, it was necessary to shift an end of the propeller shaft laterally in order to effect the reduction, which feature was not desirable since it interfered with the freedom of movement of the propeller shaft.

I also propose to provide in accordance with the feature of my invention, means associated with the clutch pedal operable by depressing the pedal beyond a certain point for controlling the operation of my novel auxiliary transmission.

An object of the present invention is to provide an improved transmission.

Another object of my invention is to provide an amidship transmission particularly adapted for use in conjunction with trucks and busses.

A further object of my invention is to provide manual means for controlling my novel amidship transmission.

Other objects and advantages of my invention will more fully appear from the following detailed description taken in connection with the accompanying drawings which illustrate one embodiment thereof and in which, Fig. 1 is a diagrammatic view illustrating the arrangement of my novel amidship change speed mechanism in a truck transmission system.

Fig. 2 is a view partly in section illustrating my amidship transmission and its relation to the usual transmission.

Fig. 3 is a sectional view taken on the line 3—3 of Fig. 2 looking in the direction indicated by the arrows;

Fig. 4 is a sectional view taken on the line 4—4 of Fig. 2 looking in the direction indicated by the arrows;

Fig. 5 is a sectional view taken on the line 5—5 of Fig. 2 looking downwardly;

Fig. 6 is an enlarged view partly in section of one of the plunger jaws illustrated in Fig. 5, showing the manner in which it is connected to the equalizing link; and Fig. 7 is a view of my novel lost-motion connection.

Referring now to the drawings in detail, in which like reference numerals designate similar parts throughout the several views, 10 denotes, in general, a motor having a main drive shaft 11 (Fig. 1), connected by a flexible coupling 12, to what I shall hereinafter refer to as an auxiliary or intermediate shaft 13. The auxiliary shaft 13 is connected at its other end to a coupling 14, to which is secured a stub shaft 15.

Associated with the motor 10 is a clutch pedal 16, such as is well known in the automobile art. As best illustrated in Fig. 7, the pedal 16 is attached to a rotatably mounted shaft 17. Formed on the pedal 16, is a hub portion 18, equipped with a projection lug 19. Loosely mounted on the shaft 17 is a small collar 20 equipped with a projection or lug 21 disposed in a position parallel to and spaced from the lug 19. Fastened to the shaft 17, is a collar 22, which is contiguous with the collar 20, and serves to maintain the collar 20 in a position with the lug 21 in the path of the lug 19. In other words, the collar 22 prevents axial movement of the collar 20 with respect to the shaft 17. The lug 21 of the collar 20, normally is spaced from the lug 19, as shown in Fig. 7. Attached to the collar 20 is an arm 23 pivotally connected at its lower end 24, to a link 25, whose other end is connected to a shifting lever 26 of my novel amidship transmission.

The lugs 19 and 21 constitute a lost motion connection between the pedal 16 and the arm 23. The lugs 19 and 21 may be so spaced from each other that by moving the pedal 16 to operate the clutch will not affect the lug 21. In other words, the pedal 16 may be moved to operate the usual clutch associated therewith, without moving the collar 20 and the arm 23. By moving the clutch pedal 16 still further, however, the lug 19 may be brought into contact with the lug 21 moving the arm 23 and through the link 25, operating the shifting lever 26. This arrangement will become more apparent as the accompanying description progresses.

In Fig. 1 I have designated my gear box containing my amidship transmission by the reference numeral 30. It should be noted that it is disposed intermediate the shaft 13 and a transmission casing 31. The transmission casing 31 contains the usual or standard accelerating and reversing transmission of an automobile. That is to say, it contains change speed gears for varying the speed at which the associated vehicle is caused to move. A gear shift lever 32 is disposed in the vicinity of the clutch pedal 16 in a position easily accessible to the operator. The lever 32 is connected to a gear shift member 34, extending into the transmission casing 31, by a suitable link 35. By manipulating the lever 32, the speed of the engine may be varied or the drive reversed. The lever 32 may be caused to move in a H-slot or the like, such as is well known in the art. Since the details of the transmission casing 31 constitutes, per se, no part of the present invention, it is believed that no further description thereof need be made.

Projecting from the transmission casing 31, is a shaft 36 which is connected to a propeller shaft 37 by a flexible or universal coupling 38. This propeller shaft runs to the differential and thence to the wheels (not shown). The gear box 30 is fastened to and carried by the transmission casing 31, which may be supported on the chassis of the vehicle in any desired manner.

Referring now to Figure 2, it will be noted that the shaft 15 is rotatably carried by the gear box and is disposed substantially in a central position with respect to the gear box 30. Splined to the inner end of the stub shaft 15 is a sleeve 40 on which is carried a pair of spaced ball bearing units 41 and 42. The unit 41 is spaced from the unit 42 by sleeve 43 surrounding the sleeve 40. The bearing unit 42 abuts a shoulder 44 on the sleeve 40 and the bearing unit 41 abuts an end of the sleeve 43 and is held in place by a pair of lock-bolts 45 and 46 threaded onto the end of the sleeve 40. Also, the stub shaft 15 is equipped with an annular groove 47 which facilitates lubrication.

The sleeve 40 is provided with an enlarged end 48 having formed therein an internal gear 49 and a clutch element 50. The clutch element 50, in reality, constitutes a clutch socket, so to speak for receiving a pinion 51 formed on a sleeve 52 surrounding a shaft 53. The sleeve 52 is splined to the shaft 53, thus causing the pinion 51 and shaft 53 to rotate together. The shaft 53 has a reduced end 54 equipped with threads for receiving a nut 55. Disposed intermediate the nut 55 and the splines of both the sleeve 52 and the shaft 53, is a washer 56 which serves to prevent the sleeve 52 from being moved axially with respect to the shaft 53. Surrounding the sleeve 52 is a ball bearing unit 57 held in place between a shoulder 58 on the sleeve 52 and a second sleeve 59 surrounding the shaft 53. Also surrounding the shaft 53 is a ball bearing unit 70 spaced from the ball bearing unit 57 by the sleeve 59 which abuts a shoulder 71 on the shaft 53.

An end of the saft 53 projects into the transmission casing 31 and has fastened thereto a pinion 72 meshing with a gear 73 carried by a countershaft 74 journaled at opposite ends in the casing 31. Associated with each end of the shaft 74 is a ball bearing unit 75 which insures smooth movement of the shaft. Disposed inside of the pinion 72 is a ball bearing unit 76 in which projects an end 77 stub of shaft 36 (Fig. 1).

The countershaft 74 carries the usual change gears by means of which power is transmitted to the stub shaft 36 in a manner well known to those familiar with the automobile art. An idler (not shown) may also be mounted in the casing in any desirable manner for causing the shaft 36 to revolve in a reverse direction, thus obtaining what is commonly termed "a reverse drive".

The end of the casing 31 adjacent the casing 30 is provided with a pair of circular apertures 80 and 81. Casing 31 is also equipped with a cover 82. Disposed in the aperture 80 is a circular cup-like sleeve 83 having an annular flange 84 abutting the outer wall of the casing 31. The ball bearing unit 75 is disposed in this cup-like sleeve 83. The unit 75 is retained in place on one side by an annular shoulder 85 formed on the sleeve 83. This shoulder 85 in reality retains the outer race of the bearing 75 in place. The inner race of the ball bearing 75 abuts an annular shoulder 86 on the reduced portion 87 of the shaft 74. Threaded onto the end of the reduced portion of the shaft is a nut 88, preferably hexagonal in form, which serves to press the inner race of the ball bearing unit 75 against the shoulder 86 of the shaft 74. Surrounding the end 87 of the shaft 74 is a washer 89 positioned intermediate the nut 88 and the inner race of the ball bearing unit 75. This washer is equipped with a lateral projection 90 which is in engagement with one side of the hexagonal nut 88. This projection 90 of the washer serves to prevent the nut 88 from becoming loose on the end of the shaft 74.

Bolted to the annular flange 84 of the cup 83 is an annular cap 91 which encloses the bolt 88 and the ball bearing unit 75. This cap may be fastened to the casing 31 by bolt 92. Although only one end of the shaft 74 is disclosed in Fig. 1, it is of course to be understood that the other end is journaled in the same manner as the end illustrated.

The shaft 53 passes through the aperture 81 in the casing 31. Surrounding the outer races of the ball bearing units 57 and 70 is a sleeve 93 which serves to space the outer races of the ball bearing units. The sleeve 93 is mounted inside of an extension 95 of the casing 31. This extension 95 has formed thereon an enlarged flange 96 to which the casing 31 is secured by bolt 97 (Fig. 4). The sleeve 93 is prevented from revolving by a set screw 98 threaded through a small boss 99 formed on the extension 95. Threaded onto the set screw 98 is a lock nut 100 by which it may be locked in any desired position.

Referring back now to the mechanism in the casing 30 and more particularly to the ball bearing units 41 and 42, it will be noted that the outer races of these bearings are carried in a sleeve-like member 101. The sleeve 101 has formed integral therewith an enlarged extension 102. This extension as thus shown in Figs. 2, 3 and 4, is equipped with a pair of bosses 103 and 104 which are diametrically opposite each other.

The lower boss 104 is equipped with an aperture 105 through which passes a rod 106 positioned in the lower part of the casing 30. One end 107 of this rod is reduced in diameter and projects into an aperture 108 in the extension 95 of the casing 31. The sleeve-like member 101 is also equipped with an extension 110 (Fig. 2), through which the rod 106 passes. This extension 110 serves as an additional support for the movable sleeve member 101. The opposite end 111 of the rod 106 is supported at 112 in the casing 30. Secured to the shaft 106 intermediate its ends is a washer 114 which is spaced a slight distance from the extension 110. Disposed intermediate the washer 114 and the boss 104 is a spring 115 which serves to return the sleeve member 101 and the accompanying parts to their normal position after operation thereof.

The end of the casing 30 opposite that to which the extension 95 is secured, is open, as indicated at 116. An end piece 117 is suitably attached to the end of the casing 30 and is equipped with an aperture 119 in which the end of the shaft 106 is carried. The end of the stub shaft 15 is fastened to one of the coupling members 118 in the aperture 116. Fastened to the end piece 117 and surrounding the shaft 15 is a cap 120 which encloses the end of the casing.

In Fig. 2 I have shown the cap member 120 fastened to the end piece 117 by means of a bolt 125 which carries a spring 126 and a washer 127 attached thereto. A plurality of such bolts may be used to attach the cap to the end piece 117. These bolts permit a certain amount of play to exist between the cap and the end piece 117. Also, as shown in Fig. 2, a small stud 121 passing through the cap 120 and having its end threaded into the end of the shaft 106. Surrounding this stud is a spring 122 disposed intermediate the head of the stud in the cap 120. This permits of a certain amount of play between the cap and the end of the shaft 106.

Since, as will become more apparent hereinafter, the shaft 15 is moved angularly, it is necessary that its mounting permit of such movement. The flexible coupling 14 permits the shaft to be moved angularly and the play between the cap 120 and the end piece 117 enables such movement to occur without interfering with the casing 30.

The member 118 of the flexible coupling 14 is equipped with a hub portion 130 through which passes the tapered end 129 of the shaft 15. A key 131 is employed to secure the shaft 129 to the hub portion 130. Also a bolt 132 is threaded upon the end of the shaft 15 and against the face of the member 118.

Referring now to Fig. 4, it will be noted that the lever 26 has formed thereon intermediate its end a ball portion 140 which is housed in an opening 141 in the casing 30. A bolt 143 extends through this ball portion 140 and is threaded at 144 into the casing 30. This bolt constitutes a pivot for the lever 26. The opening 141 is countersunk to provide an annular shoulder 146 in which is disposed a closure piece or cap 147.

Threaded into the lower part of the casing 30 is a plug 145. By removing this plug, the oil may be drained from the casing. Also the upper part of the casing is provided with a plug 148 which fills an opening through which oil may be fed into the casing when the plug is removed.

The end of the lever 26 inside of the casing 30 has a lateral bend 150 upon which is formed a rectangular block 152. The sleeve-like member 101 is cut away at 151 in order to receive the rectangular block 152 on the end of the lever 26.

The boss 103 (Fig 3) is equipped with a circular aperture 155 adapted to accommodate a lug 157 formed on the extension 95 of the casing 31. Also formed on this extension is a lug 156 which is also adapted to fit in the circular aperture 155. As will become apparent in the description of the operation of my mechanism, when the sleeve member 101 is pivoted about the rod 106, or, in other words, moved angularly, it may be moved into engagement with the other lug 156. That is to say, the boss 103 may be moved off of the lug 155 and onto the lug 156. These lugs serve to aid in supporting my novel internal gear and socket construction.

The upper part of the sleeve-like member 101 has formed thereon a lateral projection 160 (Figs. 2 and 4) equipped with a circular bore 161 through which passes a member 162. This member is equipped with a shoulder 163 which abuts the top surface of the projection 160. The lower end of the member 162 has threaded thereon a nut 163' between which and the boss 160 is a split washer 164. The upper end of the member 162 is semi-spherical in shape. I have indicated the semi-spherical end of the member 162 by the reference numeral 165. Referring now to Fig. 4 it will be noted that the casing 31 is equipped with a rectangular shaped aperture 170 and with flanges 171 which define the said aperture. Disposed over the aperture 170 and carried by the flanges 171 is a plate 173 fastened to the flanges by bolts 174. Formed in the plate 173 (Fig. 5) are a pair of slots 175 and 176; the slot 176 being not as long as the slot 175. The slots 175 and 176 are connected at one end 177. The spherical shaped portion 165 of the member 162 extends up into the slot 175, as shown in Fig. 5. This portion of the member 162 is adapted to be moved from one slot 175 to the other slot 176, as will become more apparent hereinafter.

Positioned on top of the plate 173 are a pair of plunger members 180 which are operatively connected to an equalizing link 181. Since both of the plungers are identical in construction, a description of one will suffice for both. Each plunger 180 is equipped with a jaw-like portion 182 for receiving the upper end of the member 162; namely, the spherical portion 165. The members 180 are hollow and are each equipped with a slot 183 (Fig. 6). Fitted inside of the bore 184 of the plunger member 180 is an element 185 equipped with a reduced portion 186 around which is disposed a spring 187. One end of the spring 187 abuts the jaw end of the plunger-like member 180 and the other end of the spring abuts a shoulder 188 intermediate the reduced portion 186 and the element 185 proper. The element 185 is provided with a lateral projection 190 which extends through the slot 183 in the plunger-like member 180. The free end of this lateral projection is bifurcated, as indicated by the reference numeral 191 (Fig. 2). Threaded onto an end of the equalizing link is a nut 192 equipped with a rectangular portion 193 positioned intermediate the legs 194 of the bifurcated end 191 of the projection 190.

The bifurcated end 191 is pivotally attached to the rectangular block 193 in any desirable manner. Fastened to the link 181 is a washer 196 between which and the block 193 is a compensating spring 197 which surrounds the link 181. The other end of the link associated with the other plunger member 180 is provided with the same parts as the end just described.

The plunger member 180 is equipped with a pair of slots 200 formed in its wall (Fig. 5). These slots are directly opposite to each other and are, of necessity, in alignment. Extending upwardly through the plate 173 are the shanks of a pair of bolts 202, one for each plunger member 180. The shank of this bolt 202 projects into the lower slot 200 of the plunger member 180. This is also true for both plungers.

Positioned over the plunger members 180 is a plate 205 (Figs. 4 and 5) attached to the plate 173 by bolt 206 (Fig. 5). Extending through this plate 205 are the shanks of a pair of bolts 208, one for each plunger member 180. The shanks of the bolts 208 project into the uppermost slot 200 of the plunger member 180.

A cover 210 (Fig. 4) completely encloses the plunger 180 and the link 181. This cover 210 is attached to the flange 171 by bolts 211. The operation of my transmission is as follows:—

Now it is obvious that in order to transmit motion from the engine to the rear axle, the clutch pedal 16 must be depressed by the operator or motorist to connect the shaft 13 to the engine through a suitable clutch. Now, let us assume that one is desirous of speeding up the movement of the motor vehicle without speeding up the engine 10. By depressing the clutch pedal 16 a little further than its clutching position, the lug 19 may be caused to engage the lug 21 which through the arm 23 and the link 25 operates the shift lever 26 of my novel auxiliary transmission.

The shift lever 26 in turn moves the sleeve member ball bearing units 41 and 42, and the sleeve 40 in the direction indicated by the arrow in Fig. 2. This results in the boss 103 being moved entirely off the stud 155, and compressing the spring 115 to store up energy therein. The rod 106 serves as a guide as well as a pivot for the sleeve member 101 and parts associated therewith.

This axial movement of the sleeve member 101 results in the member 162 being moved therewith and its spherical portion 165 (Fig. 5) moves along the slot 175 in the direction indicated by the arrow in Fig. 5. Upon the spherical portion 165 reaching the end of the slot 175, the internal gear or clutch socket 50 will have been moved entirely out of engagement with the spur pinion 51. Also the spur pinion 51 will be ready for engagement with the internal gear 49.

During the movement of the spherically shaped portion 165 of the member 162 in the slot 175, the plunger member 180 associated therewith is moved downwardly. The shanks of the bolts 208 in the slot 200 thereof, serve to guide the plunger member 180 in its movement. The spring 184 inside of the plunger member 180 will be compressed, and the lateral projection 190 will pivot about the end of the equalizing bolt 181. Thus it will be seen that movement of the member 162 in the slot 175 causes the plunger member 180 associated therewith to be moved into the dotted position shown in Fig. 5. Also, through the link 181 the other plunger member 180 will be moved from its lowermost position to the upper dotted position shown in Fig. 5. The link 181 serves to cause the plunger to be moved proportionately. That is to say, if one plunger is moved so far in one direction, the other plunger will be moved a proportionate distance in the other direction. Immediately upon the spherical portion 165 reaching the end of the slot 175, the spring 184 inside of the plunger 180 expands, causing the plunger member to force the member 162 over into the other slot 176. This results in the sleeve member 101 and the associated parts, including the sleeve 40 being moved angularly with respect to the pinion 51. As soon as the spherical portion 165 is in the slot 176, the spring 115 expands, causing the sleeve member 101 and its parts to be moved axially in a direction opposite to that of its former axial movement. This causes the spherical portion 165 of the member 162 to be moved to the upper part of the slot 176 illustrated in Fig. 5. It should be understood that although I have described the parts of the slot 176 and the slot 175 as upper and lower, that these slots are in a horizontal plane, and such terminology is used for convenience.

The member 162 in being moved along the slot 176 in the direction indicated by the arrow in Fig. 5, pushes the plunger member 180 out of the way. The compensating spring 197 thereafter immediately re-acts to move the plunger member 180 back to its dotted position illustrated in Fig. 5.

The return axial movement of the sleeve 40 and the sleeve member 101 results in the boss 103 fitting over the other stud 156 (Fig. 3)

and results in the internal gear 49 being moved into engagement with the spur pinion 51.

When it is desired to move the internal gear 49 out of engagement with the spur pinion and the clutch socket 50 into engagement with the spur pinion, the lever 26 is operated in the same manner as previously described. Upon operation of the lever 26, the member 162 will move from the slot 176 back to the slot 175 into the uppermost position illustrated in Fig. 5. The plunger members 180 during the travel of the member 162 will react in the same manner as they did when the member was moved from the slot 175 to the slot 176. That is to say, one of the plungers 180 will force the member from the slot 176 over to the other slot 175 and the energy stored up in the spring 115 will force it along the slot 175 to its original position or the position illustrated in Fig. 5.

Assuming that the differential in the rear axle has a 4 to 1 ratio, which is common in motor vehicles, the clutch socket or internal gear 50 and the pinion 51 may be made to have a 1 to 1 ratio, whereas, the internal gear 48 and the spur pinion 51 may be made to have a 3 to 4 ratio. Obviously, when the internal gear 49 is in engagement with the spur pinion 51, the drive transmitted to the rear wheels will be a 3 to 1 instead of a 4 to 1 ratio with respect to the engine, thus increasing the speed of the vehicle without speeding up the engine.

From the foregoing, it is apparent that the lever 26 and the spring 115 take care of the axial movement of my sleeve member 101 and sleeve 40 as well as the ball bearing units 41 and 42. Incidentally, by moving the ball bearing units with the sleeve and sleeve member, they are at all times afforded adequate bearing support. Moreover, the rod 106 serves to guide the movement of the sleeve member 101. Then, too, it is evident that when the plungers 180 move the sleeve member 101 and the associated parts angularly, the shaft 15 must also move therewith. Such movement is permitted due to the flexible coupling 14 and the play between the cap 120 and the end piece 117. The lugs 155 and 156 serve to insure that the boss 103 is always moved into either one of two positions. That is to say, these lugs guide the boss 103, and hence the associated enlargement 102 in its movement.

Of course, in order to transmit power from the engine to the propeller shaft, it is necessary that the spur pinion 51 be at all times in engagement with either the internal gear or clutch element. Power is transmitted from the shaft 53 to the parts of the standard or accelerating transmission. Since the operation of such transmission is well known to those versatile with the automobile art, it is not believed to be necessary to describe the operation of the standard transmission associated with my novel auxiliary or amidship transmission.

Although I have illustrated the auxiliary transmission as being made up of my novel internal gear construction, the invention is not to be limited thereby for the transmission could equally well be made in accordance with the features of either of my other copending patent applications Serial Nos. 74,813 and 75,194, filed December 11, 1925, and December 14, 1925, respectively. Thus it will be evident that my present invention should not be limited by the preferred embodiment of the invention herein described, but only in so far as defined by the scope and spirit of the appended claims.

I claim:—

1. In combination, a pair of members, one of said members comprising an internal gear element and a clutch element and the other a pinion, means for causing a relative movement between the members to cause the pinion to be disengaged from one element, and means set into operation by the said relative movement to cause another movement between the members for meshing the other element with the pinion and a single manual control for said members.

2. In combination, a member having an internal gear element and a clutch element, a pinion in mesh with one of the said elements, means for moving the member axially with respect to the pinion to move it out of engagement therewith, and means set into operation by the said axial movement for moving the member laterally and then axially to bring the other element into engagement with the pinion.

3. In combination, a first member comprising an internal gear element and a clutch element, a second member comprising a pinion in engagement with one of said elements, means for moving the engaged element out of engagement with the pinion, and means set into operation by the said movement for moving the first member laterally to engage the other element with the pinion.

4. In combination, a first member comprising an internal gear element and a clutch element, a second member including a pinion in engagement with one of the said elements, means for moving the engaged element out of mesh with the pinion, means rendered operative by the said movement for moving the first member laterally with respect to the second member, and means for moving the other element into mesh with the pinion.

5. In combination, a first member including a clutch element and an internal gear element, a second member including a pinion in engagement with one of the said elements, means for moving the first member to cause the internal gear element to be disengaged from the pinion, means set into operation by the said movement for moving the first member laterally with respect to the second member to align the clutch element with the pinion, and means for moving the first member to bring the aligned clutch element into mesh with the pinion.

6. In combination, a pair of toothed elements, a pinion in mesh with one of the elements, means for causing an axial separating movement between the pinion and the element in mesh therewith to disengage them, a swinging carriage invariably holding the moving element parallel to a given position, and means automatically set into operation by the said movement for causing the pinion to be engaged by the other toothed element by a swinging and plunging motion of said carriage.

7. In combination, a first member including a clutch element and an internal gear element, a second member including a pinion in mesh with one of the elements, means for moving the first member to disengage its internal gear element from the pinion, means actuated by the said movement and adapted at the end of the movement of the member to move the first member in a lateral direction to align the other element with the pinion, and means for moving the first member to bring the aligned element into engagement with the pinion.

8. In combination, a first member including an internal gear element and a clutch element, a second member including a pinion in mesh with one of the elements, means for moving the first member away from the second member to disengage said one element from the pinion, resilient means compressed by the said movement, means actuated by the said movement adapted upon the end of the movement to move the first member laterally with respect to the second member to align the other element with the pinion, and means for enabling the compressed resilient means to expand to move the first member back towards the second member to bring the aligned element into mesh with the pinion.

9. In combination, a first gear and clutch member having internal gear teeth and clutch teeth, a cooperating gear and clutch member comprising a pinion, one of said members being journaled in a stationary bearing, the other being journaled in a laterally shiftable carriage, U-shaped guiding means guiding the members into alignment to mesh either the internal gear teeth or the clutch teeth with the pinion member, automatic shifting means cooperating with the guiding means for shifting the carriage laterally from one alignment to the other, or vice versa, upon moving the members out of engagement.

10. In combination, a first gear and clutch member having internal gear teeth and clutch teeth, a cooperating gear and clutch member comprising a pinion, one of said members being journaled in a stationary bearing, the other being journaled in a laterally shiftable carriage, U-shaped guiding means guiding the members into alignment to mesh either the internal gear teeth or the clutch teeth with the pinion member, automatic shifting means cooperating with the guiding means for shifting the carriage laterally from one alignment to the other, or vice versa, upon moving the members out of engagement, and a spring for throwing the members into mesh after the operation of said shifting means.

11. In combination, a first shaft, a second shaft, an internal gear and clutch member on said first shaft, a pinion and cooperating clutch member on the second shaft, a carriage for one of said shafts, a mounting for said carriage permitting endwise and sidewise motion of said carriage, a spring for moving said carriage in a direction to bring said members into endwise engagement for either a gear drive or a direct drive, means for moving said carriage endwise against said spring to disengage said members from either position, guide means for constraining the motion of said carriage to endwise travel until said members are clear of each other and then to lateral travel, and spring controlled means energized by the withdrawal motion of said carriage to throw the carriage laterally upon the end of the withdrawal movement.

12. In combination, a first member having internal gear teeth and clutch teeth, and a cooperating pinion member having teeth adapted to mesh with either said internal gear teeth or said clutch teeth by endwise motion, means for withdrawing one of said sets of internal gear teeth or clutch teeth from mesh with said pinion, and means energized by said withdrawal for automatically throwing the other of said sets of teeth laterally into line and endwise into mesh with the pinion.

In witness whereof, I hereunto subscribe my name this 18th day of June, 1926.

THOMAS L. FAWICK.